United States Patent
Kopp et al.

(10) Patent No.: US 7,142,280 B2
(45) Date of Patent: Nov. 28, 2006

(54) EXTENDED CHIRAL DEFECT STRUCTURE APPARATUS AND METHOD

(75) Inventors: Victor Il'ich Kopp, Flushing, NY (US); Azriel Zelig Genack, New York, NY (US)

(73) Assignee: Chiral Photonics, Clifton, NJ (US)

( * ) Notice: Subject to any disclaimer, the term of this patent is extended or adjusted under 35 U.S.C. 154(b) by 251 days.

(21) Appl. No.: 10/389,617

(22) Filed: Mar. 14, 2003

(65) Prior Publication Data

US 2003/0174740 A1   Sep. 18, 2003

Related U.S. Application Data

(60) Provisional application No. 60/364,469, filed on Mar. 14, 2002.

(51) Int. Cl.
  *G02F 1/13* (2006.01)
  *G02B 6/10* (2006.01)
  *C09K 19/02* (2006.01)
  *G00F 1/1335* (2006.01)

(52) U.S. Cl. .............. 349/198; 385/131; 349/176; 349/180; 349/115; 349/104; 349/105

(58) Field of Classification Search .............. 349/193; 385/10, 129–132, 37; 372/17–20, 96, 6–7, 372/102

See application file for complete search history.

(56) References Cited

U.S. PATENT DOCUMENTS 5,061,046 A * 10/1991 Lee et al. .............. 349/193
6,141,367 A * 10/2000 Fan et al. .............. 372/53
6,304,366 B1 * 10/2001 Scalora et al. .............. 359/328
6,396,617 B1 * 5/2002 Scalora .............. 359/248
6,839,486 B1 * 1/2005 Kopp et al. .............. 385/37
2002/0003827 A1 * 1/2002 Genack et al. .............. 372/51
2003/0137999 A1 * 7/2003 Spiegelberg et al. .............. 372/6

OTHER PUBLICATIONS

Finkelman et al., "Tunable Mirrorless Lasing in Cholesteric LIquid Crystalline Elastomers" Adv Mater. 2001, 13, No. 14, Jul. 18 pp. 1069-1072.*

* cited by examiner

*Primary Examiner*—Andrew Schechter
*Assistant Examiner*—W. Patty Chen
(74) *Attorney, Agent, or Firm*—Edward Etkin, Esq

(57) ABSTRACT

A chiral structure having an advantageous extended chiral defect that provides an enhanced energy distribution characteristic therein. This is accomplished by configuring a central portion of the chiral structure with a pitch different from the rest of the structure. This may be envisioned as a distributed chiral twist with a predefined angle over a portion of a chiral structure. With the distributed defect, the photonic stop band remains wide, allowing for the substantial increase in the lifetime of the mode in which lasing occurs, while the extent of the high intensity region of the mode is large. The extended chiral defect structure may also be implemented as a thin-film chiral structure, for example using cholesteric liquid crystal or sculptured thin films.

7 Claims, 4 Drawing Sheets

EXTENDED CHIRAL DEFECT STRUCTURE APPARATUS AND METHOD

CROSS REFERENCE TO RELATED APPLICATIONS

The present patent application claims priority from the commonly assigned U.S. provisional patent application Ser. No. 60/364,469 entitled "Distributed Chiral Twist Fiber Grating" filed Mar. 14, 2002.

FIELD OF THE INVENTION

The present invention relates generally to fiber gratings, and more particularly to chiral fiber gratings comprising an extended chiral defect that provides an enhanced energy distribution characteristic therein.

BACKGROUND OF THE INVENTION

Semiconductor lasers have found many industrial and commercial applications in recent years. For example, lasers are used in telecommunications, in pickups for optically readable media used in CD players, CD ROM drives and DVD players, in medical imaging, and in video displays. However, previously known semiconductor lasers have a number of disadvantages. For example, traditional semiconductor lasers, such as ones used in CD players, emit light from the edge of a chip, making it necessary to cleave a wafer into chips and to package the chip before determining whether the laser functions properly.

In recent years, chiral materials, such as cholesteric liquid crystals, have been demonstrated and proposed in a variety of lasing and filtering applications to address common drawbacks of standard semiconductor devices such as VCSELs. For example, a commonly assigned U.S. Pat. No. 6,404,789 entitled "Chiral Laser Apparatus and Method," discloses a chiral laser with a defect formed by a light-emitting material layer. While this approach is advantageous with respect to previously known techniques, it may be difficult to construct a thin film structure having a precise light emitting material thickness required to produce a defect (the required thickness must be approximately equal to the wavelength of light in the medium divided by 4). More importantly, the position of the localized state caused by the defect cannot be easily controlled because the thickness of the light-emitting material cannot be changed once the device is manufactured.

One approach that addressed this problem was disclosed in the commonly assigned U.S. Pat. No. 6,396,859 entitled "Chiral Twist Laser and Filter Apparatus and Method" which is hereby incorporated by reference herein in its entirety. The novel approach of this patent involved creating a localized state by inducing a defect in a chiral structure composed of multiple chiral elements, by twisting one element of the chiral structure with respect to the other elements along a common longitudinal axis such that directors of the element's molecular layers that are in contact with one another are disposed at a particular "twist" angle therebetween. The resulting "chiral twist structure" enabled control of the position of the localized defect state within the photonic band gap by varying the twist angle.

This novel chiral twist structure is advantageous for a variety of applications including, but not limited to, EM filters, detectors, and lasers that are readily tunable by varying the twist angle. However, the chiral twist structure has some limitations with respect to chiral lasers. An efficient laser must maximize the energy absorption from the pump beam. This requires lasers with lengths of a fraction to several centimeters. Efficient lasing further requires that the region of high mode intensity (high local density of states) should overlap the gain region. The previously discussed abrupt chiral twist structure, has an region of high gain with length of the order of one or several localization lengths, which are comparable to the wavelength. However, this region is too short to efficiently absorb pump radiation since in such standard chiral twist structures, a short localization length is associated with the desirable features of long photon dwell time in the structure and wide photonic band gap. Another drawback of the chiral twist defect structure, is that the photon lifetime plateaus with increasing sample length, thereby limiting the reduction in the laser threshold that can be achieved with this structure. [See "Twist Defect in Chiral Photonic Structures," V. I. Kopp and A. Z. Genack, Phys. Rev. Lett. 89, 033901 (2002)]. In addition, in chiral fiber structures produced by twisting glass fibers, it is difficult to achieve a sharp twist angle.

It would thus be desirable to provide a novel chiral defect structure that has a smoother variation of the energy distribution along an extended portion of its length and thus absorbs pump radiation more efficiently than a standard chiral twist structure. It would be further advantageous to provide a structure, which overcomes the limitation associated with the saturation of the lifetime of the mode and which can be readily manufactured in a continuous process.

BRIEF DESCRIPTION OF THE DRAWINGS

In the drawings, wherein like reference characters denote elements throughout the several views.

SUMMARY OF THE INVENTION

Figure 1A:
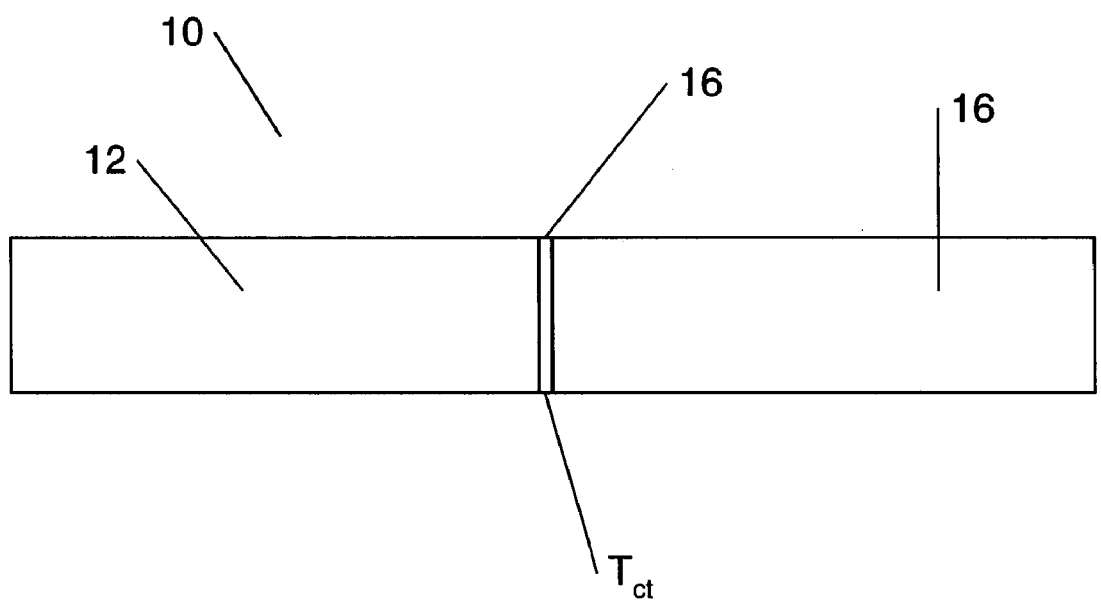
FIG. 1A is a schematic diagram of a prior art active chiral twist structure.

The present invention is directed to a novel extended chiral defect structure that may be based on a thin film chiral structure (for example composed of multiple sequential layers of cholesteric liquid crystals (CLCs), or sculptured thin films), or, preferably, based on a specially configured optical chiral fiber structure, for example, having advantageous optical properties similar to a CLC structure.

The chiral fiber structure used in the inventive chiral broadband tuning structure achieves optical properties similar to a CLC structure because it satisfies the requirement satisfied in a CLC structure that the pitch of the structure is twice its period. This is accomplished by using a chiral fiber structure having geometric birefringence with 180-degree symmetry. Such properties may be obtained by imposing two identical coaxial helices along a fiber structure, in such a way that the second helix is shifted by half the structure's pitch from the first helix. Such structures are described in greater detail in the co-pending commonly assigned U.S. Patent applications entitled "Apparatus and Method for Manufacturing Fiber Gratings", "Apparatus and Method of Manufacturing Helical Fiber Bragg Gratings", "Apparatus and Method for Fabricating Helical Fiber Bragg Gratings", "Helical Fiber Bragg Grating", and "Long Period Chiral Fiber Grating and Apparatus and Method of Fabrication Thereof" which are hereby incorporated by reference herein in their entirety. The preferred embodiment of the inventive distributed chiral twist structure is discussed below.

As noted above, the inventive extended chiral defect structure may also be implemented as a thin film chiral structure (for example composed of CLC films) or, preferably, as a chiral fiber structure. The extended chiral defect structure is composed of three sequential elements, the first and third elements having one pitch, and the second, middle element, having another pitch. The extended defect chiral fiber grating structure, when it is doped with an active material, is advantageous, relative to a standard chiral twist structure possessing an abrupt twist, in that absorption may take place over a greater length of the structure.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

DETAILED DESCRIPTION OF PREFERRED EMBODIMENTS

The present invention is directed to an advantageous extended defect chiral fiber grating structure, having a substantial length over which energy may be absorbed and emitted. This is accomplished by constructing a central portion of a chiral fiber with a different pitch from the end portions. With the extended or distributed defect, a single sharp mode or a series of sharp modes appear within the photonic stop band.

Even when the central portion of the inventive structure is so long as to result in multiple modes appearing within the reflection band, the mode at a frequency which corresponds to the first band-edge mode in a uniform chiral structure has a substantially lower laser threshold than the other modes. This allows for lasing at a single frequency. At the same time, the photon dwell time in this mode is substantially longer than for even the longest lived modes in a chiral grating with uniform pitch.

Before describing the present invention in greater detail, it would be helpful to provide definitions of common terms utilized in the dielectric component. "Chiral" materials are not symmetrical on a molecular level—that is molecules of chiral materials are not identical to their mirror images. Cholesteric materials, such as cholesteric liquid crystals (hereinafter "CLCs"), have multiple molecular layers in which the orientation of molecules in the consecutive layers are rotated at a small fixed angle relative to molecules in the adjacent layers. Thus, the average direction of the molecules, known as a "director", rotates helically throughout the cholesteric material. A pitch of a cholesteric material is defined as a thickness of the material in which the director rotates a full 360 degrees.

CLCs and other chiral structures having similar properties, have a particular reflection band (associated with the photonic band gap—hereinafter "PBG") which is a result of its periodic structure—a range of wavelengths in which the transmission of light through the structure is small as a result of multiple coherent reflection within the structure. At the edge of the photonic stop band gap there are a series of narrow photonic states (or modes) at the peak of which the transmission of light reaches unity. The spectral width of these states is proportional to the inverse of the dwell time for the photons within the CLC medium.

When a spatially localized defect is introduced into a CLC structure by modifying the periodic structure by adding spacing, an additional layer of a different material, an angular twist between consecutive layers, or a combination thereof, then an additional localized photonic state or number of photonic states may be introduced into the PBG.

A thin film chiral structure, such as may be used in conjunction with the present invention, is described in greater detail in the above-described U.S. Pat. Nos. 6,404,789 and 6,396,859. An exemplary thin film chiral structure may comprise several sequential layers within a CLC film.

A chiral fiber is a novel structure that mimics CLC properties—the cholesteric periodic photonic band gap structure—in a fiber form. A commonly assigned co-pending U.S. Patent Application entitled "Chiral Fiber Grating" (hereinafter "CFG")) which is hereby incorporated by reference in its entirety, disclosed the advantageous implementation of the essence of a cholesteric periodic PBG structure in an optical fiber. This novel approach captured the superior optical properties of CLCs while facilitating the manufacture of the structure as a continuous (and thus easier to implement) process. The chiral fiber structure is preferable for implementing the novel distributed chiral twist because of the relative ease of controlling the pitch in the fiber structure during fabrication in the structure as described below.

Figure 2A:
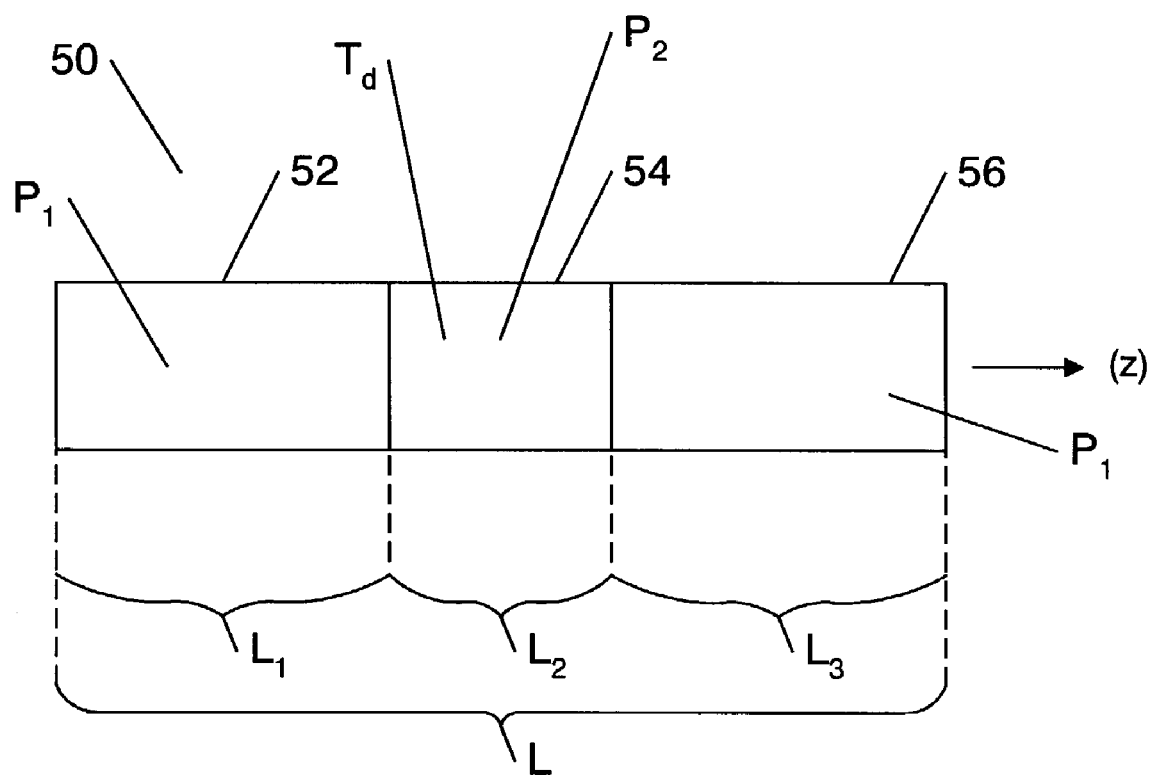
FIG. 2A is a schematic diagram of a distributed chiral twist structure of the present invention.

Referring now to FIG. 1A, a previously known chiral twist structure 10 doped with an active material, having a first chiral element 12 and a second chiral element 16 is shown with a chiral twist 14 at a chiral twist angle $T_{ct}$. To position the photonic defect mode in the center of the PBG, $T_{ct}$ is set to approximately 90 degrees. Referring now to FIG. 2A, the energy distribution within the structure 10 is shown as peaking exponentially at the defect mode generated by the chiral twist 14.

Referring now to FIG. 2A, the inventive extended chiral defect structure 50 is shown. The structure 50, doped with an active material, is of a length L, and is composed of a first chiral fiber element 52 of a length $L_1$ and having a pitch $P_1$, a second chiral fiber element 54 of a length $L_2$ having a pitch $P_2$, and a third chiral fiber element 56 of a length $L_1$ having a pitch $P_1$. The second element 54 can be envisioned as a gradual chiral twist of a desired predetermined angle T between the first and third sections 52, 56. The values of $P_1$ and $P_2$ may be selected as a matter of design choice depending on the desired application of the distributed chiral twist structure 50, however, the relationship between $P_1$ and $P_2$ must be such that one of the first band edge modes of the PBG of element 54 should be approximately centrally positioned in the PBGs of elements 52 or 56. An exemplary expression that accomplishes this objective may be shown as:

$$P_2 = P_1 * (n_{AV}/n_o)$$

or $$P_2 = P_1 * (n_{AV}/n_e),$$

where $n_{AV} = (n_o + n_e)/2$, where $n_{AV}$ is the average refractive index of the structure 50, $n_o$ and $n_e$ are ordinary and extraordinary refractive indices, respectively, in the case that the structure 50 is a thin film structure or, in the case that the structure 50 is a chiral fiber structure, $n_o$ and $n_e$ are indices along two perpendicular axis of the optical indicatrix perpendicular to direction of light propagation.

Similarly, the values of lengths $L_1$, $L_2$ and $L_3$ may be selected as a matter of design choice depending on the desired application of the extended chiral defect structure 50. However, preferably the relationship between $L_1$, $L_2$ and $L_3$ may be expressed as follows:

$$L_2 = L/4, \text{ and}$$

$$L_1 = L_3 = (3/8)L$$

Figure 1B:
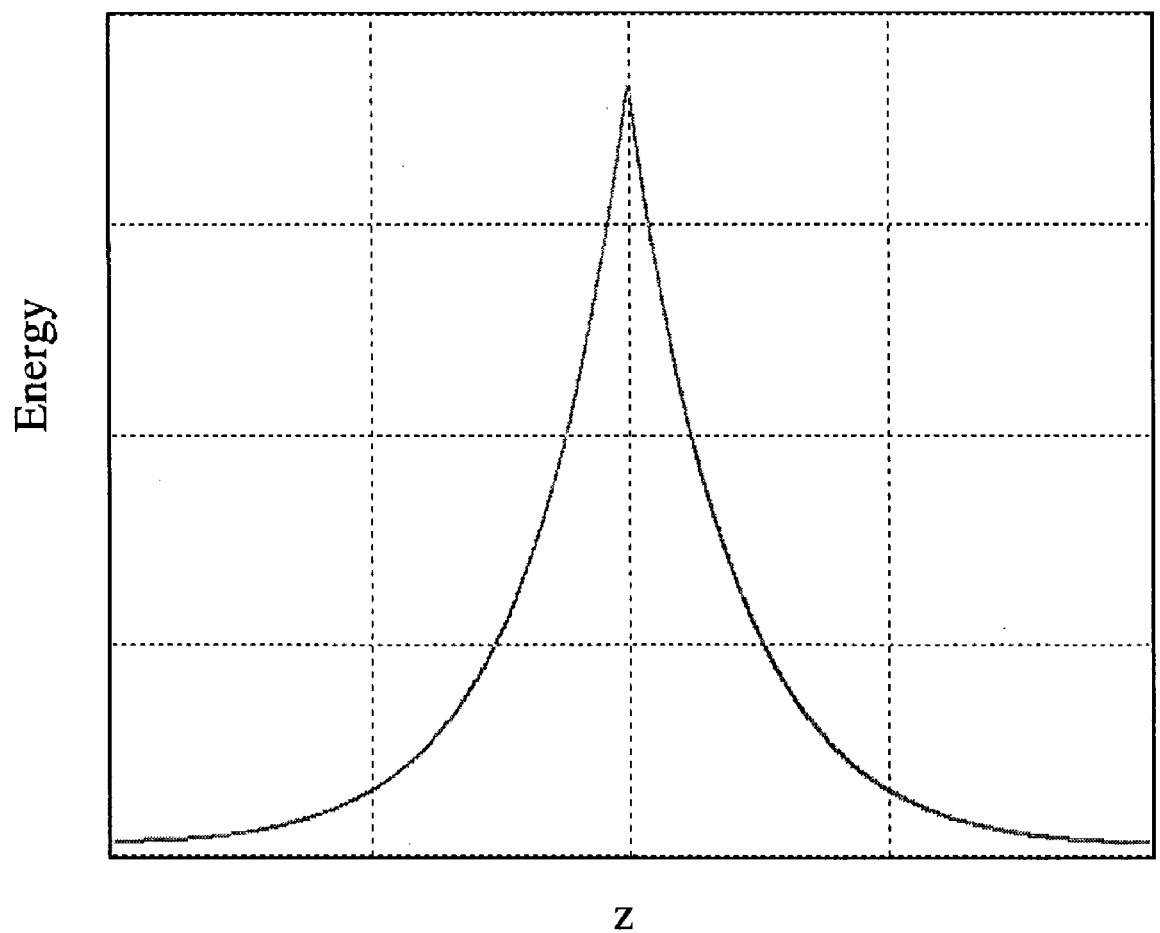
FIG. 1B is a graph diagram of the energy distribution in the chiral twist structure of FIG. 1A.
Figure 2B:
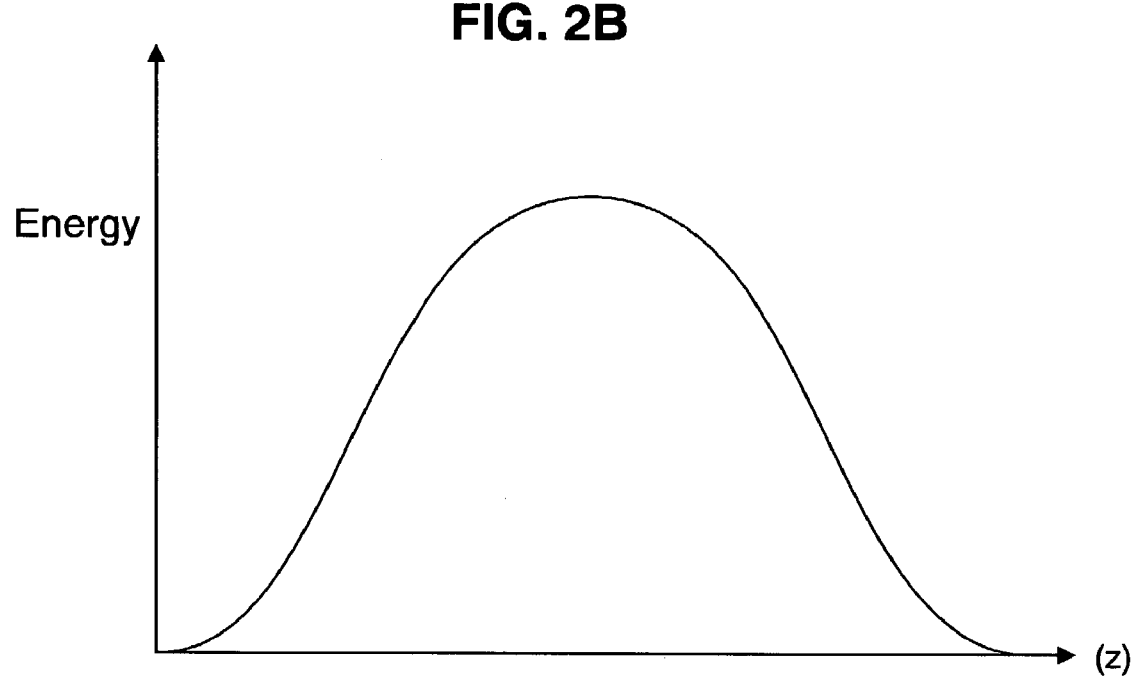
FIG. 2B is a graph diagram of the energy distribution in the inventive distributed chiral twist structure of FIG. 2A.

The inventive distributed chiral twist structure 50 is advantageous over a previously known chiral twist structure 10, in that the spatial energy distribution inside the structure 50 is on a greater length scale as is shown in the graph of the energy distribution in FIG. 2B, as compared to the energy distribution graph of structure 10 shown in FIG. 1B. The spatial energy distribution in the structure 50 rises exponentially towards the central element 54 in the first and third elements, 52 and 56, respectively, producing a high value of the energy density at the edges of element 54. The energy density then rises smoothly towards a peak at the center of element 54 and then smoothly decays. As a result, a substantial enhancement of the intensity over the length of the structure 50 is produced.

Thus, while there have been shown and described and pointed out fundamental novel features of the invention as applied to preferred embodiments thereof, it will be understood that various omissions and substitutions and changes in the form and details of the devices and methods illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. It is the intention, therefore, to be limited only as indicated by the scope of the claims appended hereto.

We claim:

1. An extended chiral defect structure having a photonic band gap comprising:
    a first section of a first length and having a first pitch;
    a sequential second section of a second length and having a second pitch, wherein said second pitch is different from said first pitch; and
    a sequential third section of a third length and having said first pitch, wherein said second section comprises an extended chiral defect that forms at least one photonic mode within the photonic band gap of the structure with substantially smooth and high energy distribution in a middle portion of the structure corresponding to said second section.

2. The extended chiral defect structure of claim 1, wherein said first, said second and said third sections are chiral fiber gratings.

3. The extended chiral defect structure of claim 2, wherein said first, said second and said third sections are regions of a unitary chiral fiber grating.

4. The extended chiral defect structure of claim 1, wherein said first, said second, and said third sections are composed of cholesteric liquid crystal films.

5. The extended chiral defect structure of claim 1, wherein a relationship between said second pitch and said first pitch is approximately defined by one of the following expressions (a) and (b):

$$P_2 = P_1(n_{Av}/n_o) \quad (a)$$

and $$P_2 = P_1(n_{Av}/n_e), \quad (b)$$

where $n_{Av} = (n_o + n_e)/2$ where $P_2$ is said second pitch and where $P_1$ is said first pitch, where $n_{Av}$ is an average refractive index of the structure, in which:

(1) $n_o$ and $n_e$ are ordinary and extraordinary refractive indices, respectively, when the chiral structure is a thin film structure, and (2) $n_o$ and $n_e$ are indices along two perpendicular axis of the optical indicatrix perpendicular to the direction of light propagation within the structure, when the chiral structure is a chiral fiber grating structure.

6. The extended chiral defect structure of claim 1, wherein a relationship between said first length, said second length and said third length is approximately defined by a following expressions:

$$L_2 = (L_1 + L_2 + L_3)/4,$$

and $$L_1 = L_3 = (3/8)*(L_1 + L_2 + L_3),$$

where $L_1$ is said first length, $L_2$ is said second length, and $L_3$ is said third length.

7. A method for forming an extended chiral defect structure, having a photonic band gap, comprising the steps of:
    (a) providing a first section having a first pitch, a sequential second section having a second pitch, wherein said second pitch is different from said first pitch; and a sequential third section having said first pitch; and
    (b) imposing an extended chiral defect in said second section between said first and said third sections to form at least one photonic mode within the photonic band gap of the structure wit substantially smooth high energy distribution in a middle portion of the structure.

* * * * *